(12) United States Patent
Therer et al.

(10) Patent No.: US 7,517,018 B2
(45) Date of Patent: Apr. 14, 2009

(54) COMPACT BASE FOR A SEAT WITH A SUSPENSION INDEPENDENT OF HEIGHT ADJUSTMENT

(75) Inventors: Claude Therer, Sherbrooke (CA); André Albert, Sherbrooke (CA); Bruno Archambault, Sherbrooke (CA); Étienne Archambault, Sherbrooke (CA); Maxime Laplante, Sherbrooke (CA)

(73) Assignee: Baultar I.D. Inc., Windsor, Quebec (CA)

( * ) Notice: Subject to any disclaimer, the term of this patent is extended or adjusted under 35 U.S.C. 154(b) by 205 days.

(21) Appl. No.: 11/785,547

(22) Filed: Apr. 18, 2007

(65) Prior Publication Data
US 2007/0284927 A1    Dec. 13, 2007

(30) Foreign Application Priority Data
Apr. 18, 2006    (CA)    ................................. 2543704

(51) Int. Cl.
*B60N 2/02*    (2006.01)
*B60N 2/50*    (2006.01)
(52) U.S. Cl. ............ 297/339; 297/344.19; 297/DIG. 10
(58) Field of Classification Search ................ 297/338, 297/339, 344.12, 344.18, 344.19, 452.41, 297/DIG. 10; 248/564, 619, 621, 633
See application file for complete search history.

(56) References Cited

U.S. PATENT DOCUMENTS

| | | | | |
|---|---|---|---|---|
| 1,488,206 A | * | 3/1924 | Koenigkramer | .............. 60/415 |
| 2,615,499 A | * | 10/1952 | Wallace | ....................... 297/325 |
| 2,884,047 A | * | 4/1959 | Abbott | ........................ 297/339 |
| 2,961,033 A | * | 11/1960 | Galbraith | ..................... 248/575 |
| 4,234,989 A | * | 11/1980 | Pearcy | ......................... 114/363 |
| 4,592,590 A | * | 6/1986 | Slaats et al. | ............ 297/344.19 |
| 4,593,951 A | * | 6/1986 | Slaats et al. | ............ 297/344.19 |
| 4,621,868 A | * | 11/1986 | Slaats et al. | ............ 297/344.19 |
| 5,992,815 A | * | 11/1999 | Metzdorf et al. | ............ 248/631 |
| 2002/0195535 A1 | * | 12/2002 | Carlson et al. | .............. 248/575 |

FOREIGN PATENT DOCUMENTS

| | | |
|---|---|---|
| CA | 2420324 | 9/2004 |
| CA | 2516560 | 11/2004 |
| DE | 3129101 A1 * | 3/1983 |
| GB | 2309894 | 8/1997 |

OTHER PUBLICATIONS

Mazoyer, J., Étude De La Suspension Active De Siége, (Août 2005). (translation not available).

* cited by examiner

*Primary Examiner*—Joseph F Edell
(74) *Attorney, Agent, or Firm*—William E. Beaumont (57) ABSTRACT

An object of the present invention is to provide a compact base for a seat with a suspension for a vehicle driver, for use in buses, heavy vehicles or special use vehicles, including excavation vehicles or foresting equipment, in which the operator or driver is subject to vibrations. The present invention provides total independence of the suspension properties, including stiffness, damping and range of travel, with height adjustment. In order to accomplish this, the compact base for the seat is divided into parts including a suspension and a seat height adjustment mechanism. These parts have no common component including balloons, dampers or guiding systems. In this manner, the suspension properties of the seat are not affected by the seat height adjustment. Moreover, the invention provides a compact seat base through the use of structures and balloons that fit one within the other.

20 Claims, 6 Drawing Sheets

Fig. 6

COMPACT BASE FOR A SEAT WITH A SUSPENSION INDEPENDENT OF HEIGHT ADJUSTMENT

This application claims priority of Canadian patent Application No. 2,543,704, filed on Apr. 18$^{th}$, 2006.

FIELD OF THE INVENTION

The present invention generally relates to seats for use in different vehicles subject to vibrations. More particularly, it relates to a compact base for a seat with a suspension independent of the height adjustment of the seat.

BACKGROUND OF THE INVENTION

Typical designs for passive suspensions for seats comprise among other things, a guiding mechanism, a spring element as well as a damping element. The guiding mechanism has for example a scissor type mechanism, allow vertical movements of the seat, which are required during height adjustment as a function of the size of the operator, as well as movements caused by isolation of the suspension when the seat is subject to vibrations. The spring and damping elements allow an attenuation of the vibrations transmitted to the seat.

Pneumatic type passive suspensions typically integrate a pneumatic balloon as a spring element. This type of suspension generally has the disadvantage of offering suspension performances dependent on the chosen height setting. The dependence between the height adjustment of the seat and its suspension comes among other things from the dual role of the pneumatic balloon of the seat. Indeed, the driver can vary the volume of air in the balloon to adjust the height of the seat. Once the adjustment is made, the same balloon acts as a spring element for the suspension.

The first consequence of such a design is the geometric dependence between the height adjustment and the range of motion of the suspension. The effects of this can be observed notably when the height adjustment of the seat is a very high or very low position. In these situations, the end-of-travel abutments of the guiding mechanism of the seat interfere with the normal range of motion of the suspension by limiting its travel, which provokes frequent shocks that are uncomfortable for the driver. These shocks are harmful to the health and safety of the driver, and consequently opposite to the desired effect of a seat suspension, which consists to isolate the driver from any shock or vibration from the vehicle.

The second consequence of such a design is that, generally the stiffness of the balloon varies as a function of the height adjustment. Indeed, the seat occupant varies the volume air of the balloon to adjust the height of the seat. However, the more a balloon has a high volume of air, the more its stiffness is low, as long as the maximum volume is not met.

Furthermore, in the cases of most passive seat suspensions, the shock absorber fixed between the base of the seat and one of the scissor mechanisms has a rotational movement when the seat is in an ascending or descending motion. This non linear movement renders the rate of shock absorption non-constant over the complete range of height adjustment of the seat. Consequently, there is a third dependence between the performance of the seat suspension and the height adjustment.

A simple solution to decrease the level of incomfort of the shocks caused by the interference of the end-of-travel abutments mentioned hereinabove is the introduction of progressive end-of-travel abutments. However, in this case, the suspension looses a lot of its efficiency in the cases where the abutments often interfere with the normal range of motion of the suspension.

A better solution is a suspension, which is independent of the height adjustment mechanism of the seat. In such a case, the properties of the suspension, stiffness, range of motion and shock absorption, remain identical no matter what the height adjustment of the seat is, whether it is adjusted to its minimum or maximum positions.

The concept of a suspension independent from the height adjustment already exists. Patent applications CA 2,516,560 and CA 2,420,324 disclose the idea but apply it to an active suspension by specifying that the independence in the height adjustment is useful for limiting any drop of the seat caused by a break in the suspension or a failure in the actuator. Indeed, the drop is thus limited to the range of travel of the suspension and does not include the height adjustment range distance. These patent applications are not related to an improvement of the performance of compact passive suspensions.

Patent GB 2,309,894 also discloses an independent suspension from the height adjustment but only related to the range of motion of the suspension. Nothing else is disclosed, which renders the other suspension properties independent, including stiffness and shock absorption. Indeed, in this patent, since a suspension balloon is used with a volume of air that varies according to the height adjustment of the seat, this balloon suspension does not have consequently the same stiffness properties with high and low positions for the seat.

The objective of making the properties of the suspension independent from the height adjustment of the seat can be met by using two mechanisms that each fulfills its function without sharing common components. This can be accomplished by superposing a suspension mechanism stage on top of a height adjustment mechanism stage. Each mechanism stage has its own guiding systems, which allow vertical movement, in one case for height adjustment for the seat and in the other case for allowing a range motion for the suspension. The suspension stage has spring and damping elements that attenuate shocks and vibrations. The height adjustment stage has its own actuator in order to adjust the height as well as a locking system to fix this position. With this design, there are no common elements between the two systems, as opposed to what it seen commonly in pneumatic passive suspensions or with pneumatic balloons that play at the same time the role of a spring element for the suspension as well as an actuating element for adjustment of the height. Therefore, an independent suspension allows one to have a seat with properties of stiffness, dampening and potential range of motion that do not vary as a function of the height of the seat chosen by the operator.

However, this double mechanism requires a certain amount of space, which becomes a significant disadvantage in seat applications where certain drivers require a seating position which can be very low. Given that, for a very low driving position, the double mechanism would allow a normal range of motion of the suspension, which would cause movements that would be even lower than a normal driving position, their remains very little place between the bottom of the seat to introduce all the components of this double mechanism.

Thus, there is presently a need for a compact base for a seat with a suspension for a vehicle driver, in particularly for buses, for heavy vehicles or vehicles for special use, for example excavation vehicles or vehicles for forestry equipment, and in which the operator or the driver is subject to vibrations. Furthermore, there is a need for a compact base for a seat, which allows the suspension to be independent from the height adjustment for the seat. There is also to obtain total independence in the properties of the suspension, including stiffness, damping and range of motion, from height adjustment while offering a large range of motion for adjustment of the seat, as well as a very low minimum height adjustment position.

SUMMARY OF THE INVENTION

An object of the present invention is to provide a compact seat base that addresses the above-mentioned needs and in which the pneumatic suspension is totally independent from the height adjustment of the seat and which offers a large range of motion in height adjustment as well as a very low minimum position of the seat.

More particularly, the invention provides a base for a seat comprising:
- a base structure comprising a first hollow upwardly open socket having a first socket inner surface;
- an intermediate structure comprising a second hollow upwardly open socket coaxially fitting within the first socket and having a second socket inner surface and a second socket outer surface;
- a seat support structure on which a bottom of the seat is fixed, the seat support structure comprising a hollow downwardly open cup structure coaxially fitting within the second socket;
- a height adjustment balloon having height adjustment balloon sidewalls resting against the first socket inner surface and the second socket outer surface for telescopic displacement of the intermediate structure with respect to the base structure;
- a suspension balloon having suspension balloon sidewalls resting against the second socket inner surface and the cup structure for telescopic displacement of the cup structure with respect to the second socket; and
- pressurization means for pressurizing the height adjustment balloon and the suspension balloon, wherein the height adjustment balloon and the suspension balloon are selectively and independently pressurized to provide a resilient adjustment of a height of the seat between a lower position and an upper position.

Another object of the present invention is to provide total independence of the properties of the suspension, including stiffness, damping and range of motion, with height adjustment. In order to accomplish this, the compact base of the seat is divided into parts. The two major parts have no common components including balloons, dampers or guiding systems. In this manner, the suspension properties of the seat are not affected by the seat height adjustment.

Another object of the present invention is to provide a compact suspension system. The two balloons as well as the structure associated with the system have the characteristic of fitting within each other.

In addition to their compactness, the balloons are independent from the seat structures. The balloons are positioned within cylindrical structures present among the seat structures and are maintained in place through friction and through the air pressure they contain. Therefore there are no tight seals required during assembly of the seat, which saves assembly and maintenance time, and also allows a gain in the available space for the balloons and structures. In order to offer a large range of motion in the height adjustment while also giving a very low minimum allowable height, the height adjustment balloon is telescopically adjusted around an empty metallic cylinder. The above-mentioned cylinder allows the addition of a fold on the siding of the balloon such that the balloon can fold itself completely within the height, which is allocated when the seat is at is minimum position.

An advantage of the present invention resides in the fact that the balloons are designed to act vertically along an axis approximately aligned with the center of gravity of the seat and of its occupant. This configuration provides relief to the principal structural supports of the seat, more particularly the structures related to the suspension and height adjustment. Moreover, this position of the axis of the balloons relative to the central gravity is conserved, no matter what the adjustment of the seat is in the front-back direction given that the mechanism for the front-back adjustment is located at the base of the seat under all of the balloon mechanisms.

Another advantage of the present invention is that the seat is modular. It is possible to easily replace the suspension damper located in the second part of the seat support structure with an actuator or a variable damping control system. Consequently, the seat can again become either an active or semi-active suspension seat. A rigid locking system for the height adjustment is required in such situations, as well as the presence of a control system including a controller and at least one detector generating inputs for the control system.

A non-restrictive description of a preferred embodiment of the present invention will now be given with reference to the appended drawings.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT

Figure 1:
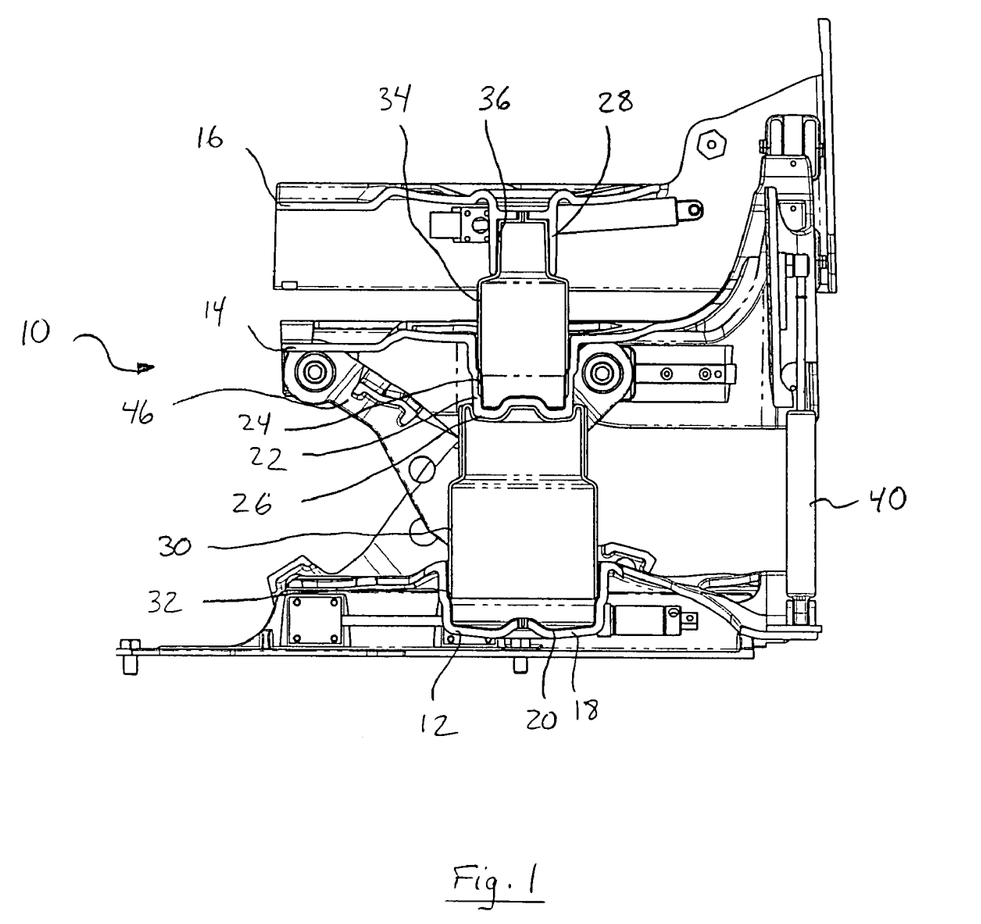
FIG. 1 is a cross-sectional view of a base for a seat according to a preferred embodiment of the present invention through the center of the seat and consequently through the center of balloons with the balloons in their position of maximum travel with the seat in its highest position.
Figure 2:
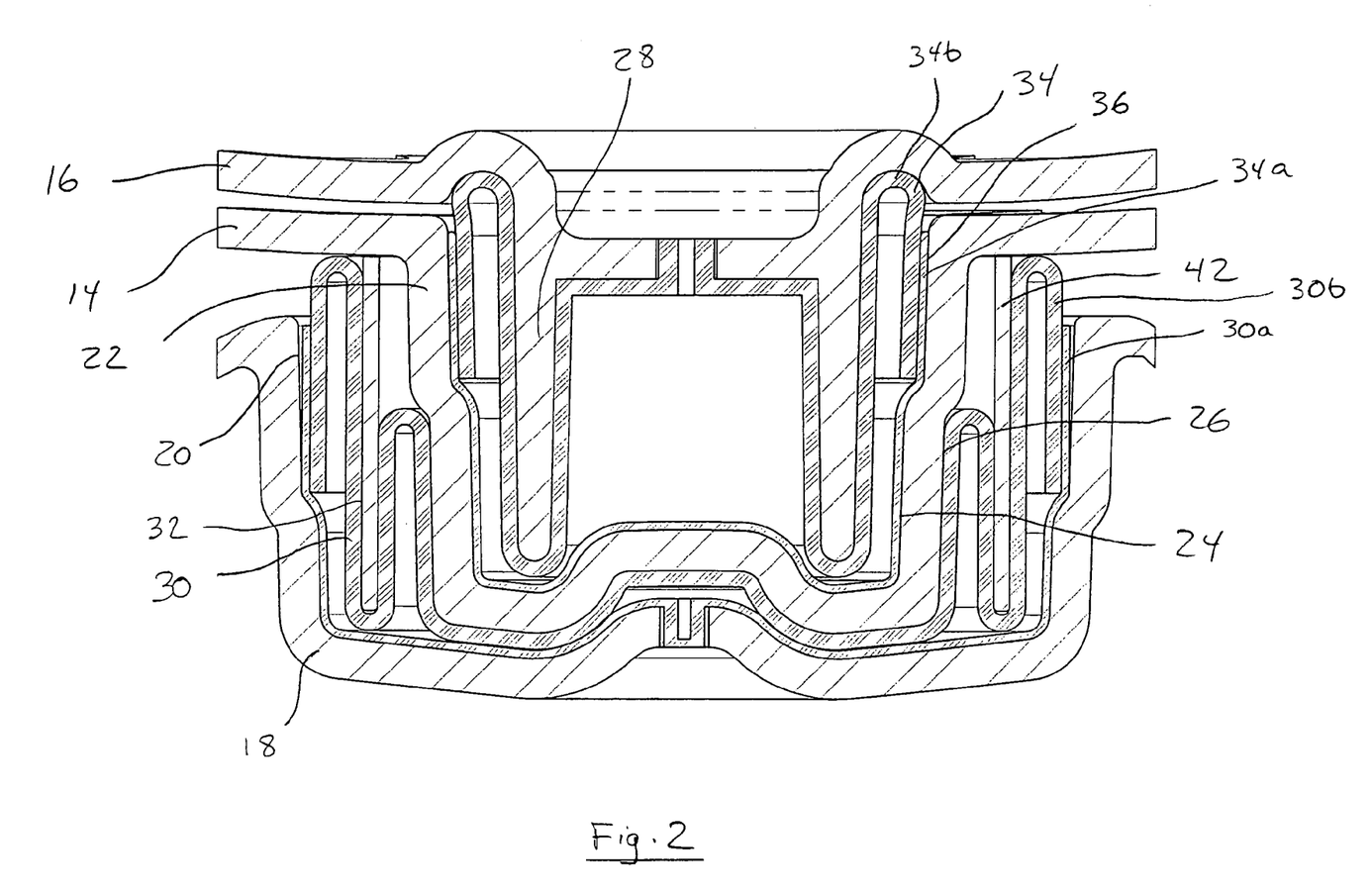
FIG. 2 is a detailed view showing the center of the base for a seat shown in FIG. 1 through the center of the balloons with the balloons at their minimum position of travel.

As shown in FIGS. 1 and 2, the present invention provides a base 10 for a seat comprising a base structure 12, an intermediate structure 14 and a seat support structure 16. The base structure 12 comprises a first hollow upwardly open socket 18 having a first socket inner surface 20. The intermediate structure 14 comprises a second hollow upwardly open socket 22 coaxially fitting within the first socket 18 and having a second socket inner surface 24 and a second socket outer surface 26. The seat support structure 16, on which a bottom of the seat is fixed, comprises a hollow downwardly open cup structure 28 coaxially fitting within the second socket 22. The base 10 further comprises a height adjustment balloon 30 having height adjustment balloon sidewalls 32 resting against the first socket inner surface 20 and the second socket outer surface 26 for telescopic displacement of the intermediate structure 14 with respect to the base structure 12. The base 10 further comprises a suspension balloon 34 having suspension balloon sidewalls 36 resting against the second socket inner surface 24 and the cup structure 28 for telescopic displacement of the cup structure 28 with respect to the second socket 22. The base 10 further comprises pressurization means for pressurizing the height adjustment balloon 30 and the suspension balloon 34. The height adjustment balloon 30 and the suspension balloon 34 are selectively and independently pressurized to provide a resilient adjustment of a height of the seat between a lower position (shown in FIG. 4) and an upper position (shown in FIG. 1).

Figure 3:
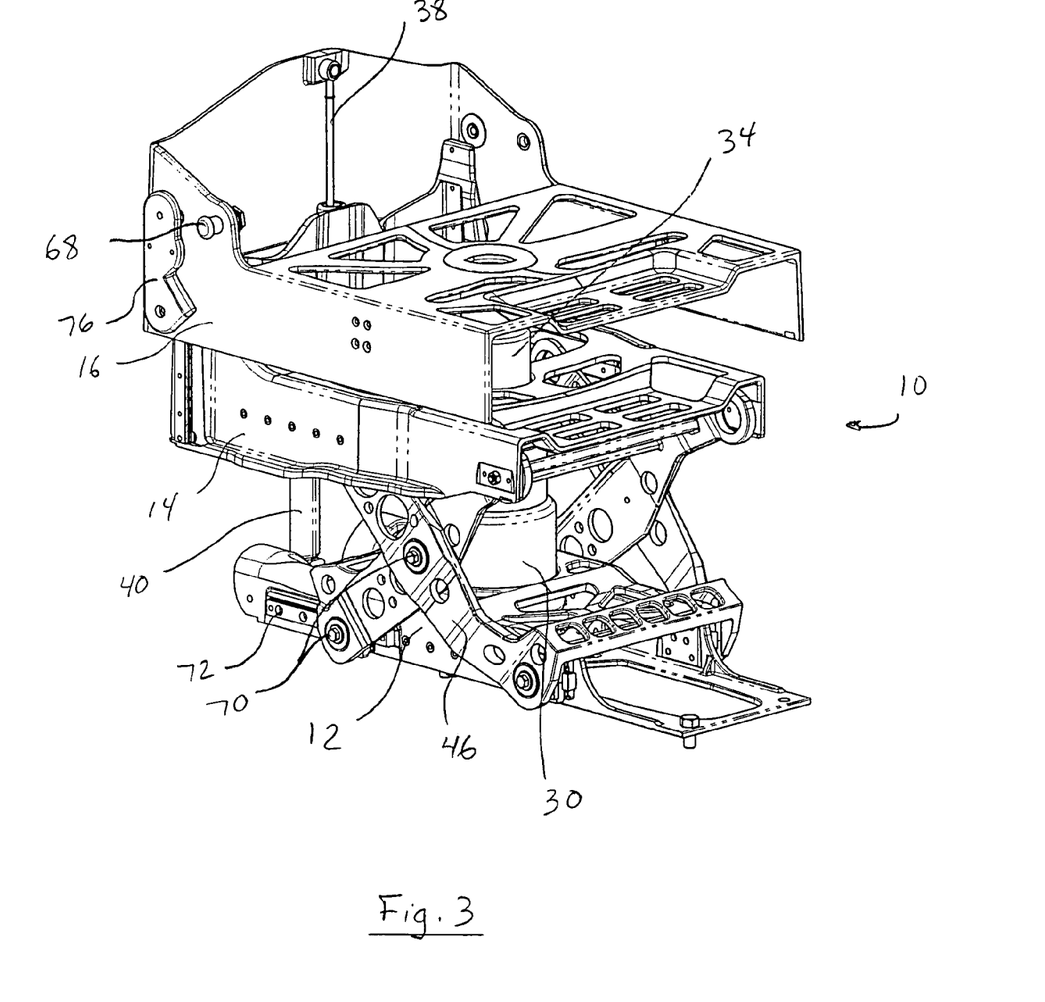
FIG. 3 is a perspective view of the base for a seat shown in FIG. 1.

Preferably, as shown in FIG. 3, the base 10 further comprises a suspension damper 38 linking the intermediate structure 14 to the seat support structure 16.

Preferably, as shown in FIG. 3, the base 10 further comprises a height-adjustment damper 40 linking the intermediate structure 14 to the base structure 12.

Preferably, as shown in FIG. 2, the base 10 further comprises a hollow rigid tube 42 sized to fit coaxially with the first and second sockets 18, 22, between the first socket inner surface 20 and the second socket outer surface 26 and folding the height adjustment balloon 30 when the seat is in the lower position.

Figure 5:
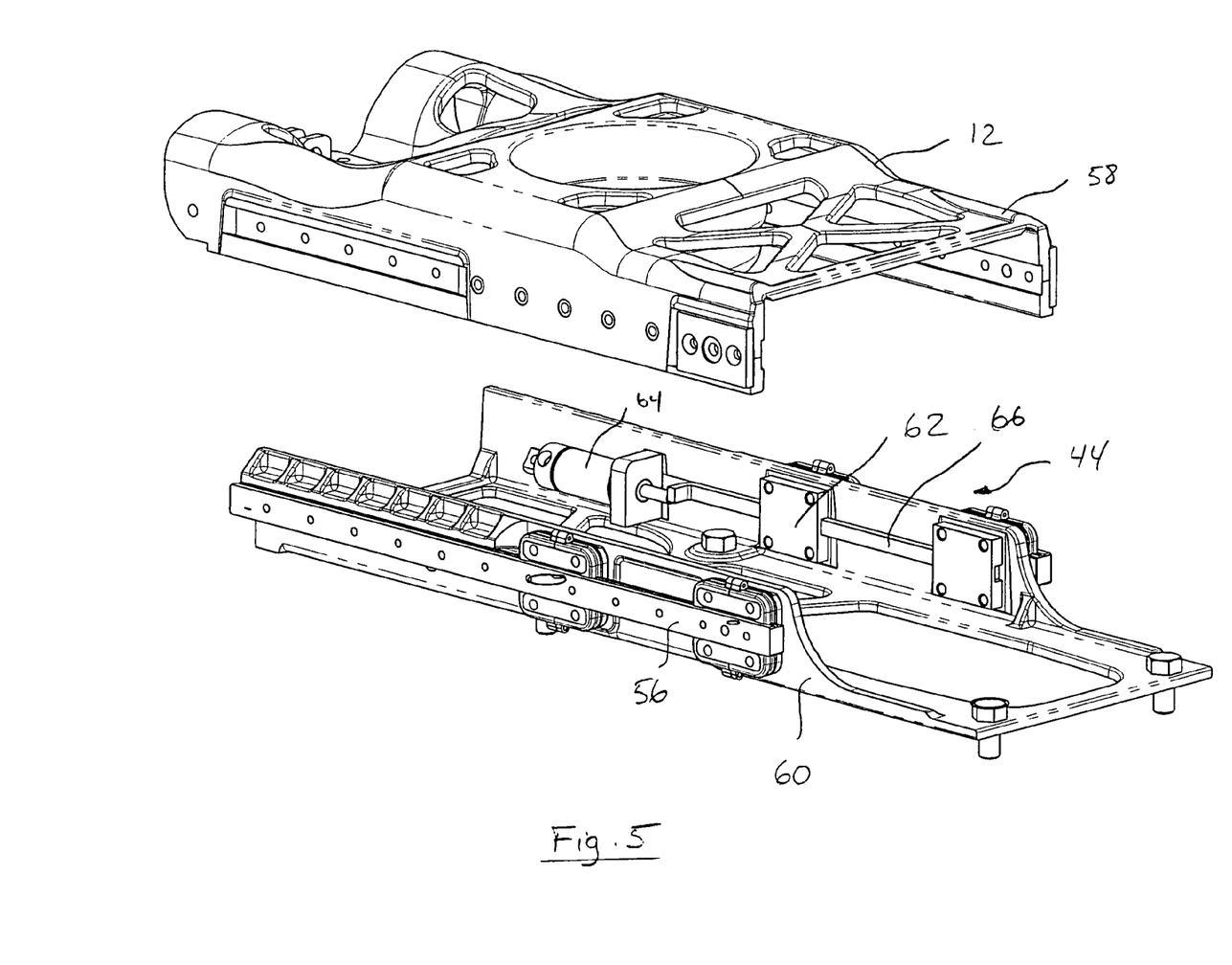
FIG. 5 is an exploded view of the base structure of the base shown in FIG. 1 as well as the mechanism for front-back adjustment.

Preferably, as shown in FIG. 5, the base further comprises a front-back adjustment mechanism 44 fixed to the base structure 12 allowing displacement of the base 10 along a horizontal plane.

Preferably, as shown in FIGS. 1 and 3, the suspension balloon 34 and height adjustment balloon 30 act vertically along an axis generally in alignment with a center of gravity of the seat with an occupant.

Preferably, as shown in FIG. 2, each of the suspension balloon 34 and of the height adjustment balloon 30 is made from a first moulded rubber piece 30a, 34a and a second moulded rubber piece 30b, 34b that are assembled together through vulcanization of a rubber seal.

Preferably, as shown in FIGS. 1 and 3, the base 10 further comprises a scissor mechanism 46 linking the base structure 12 to the intermediate structure 14.

Figure 4:
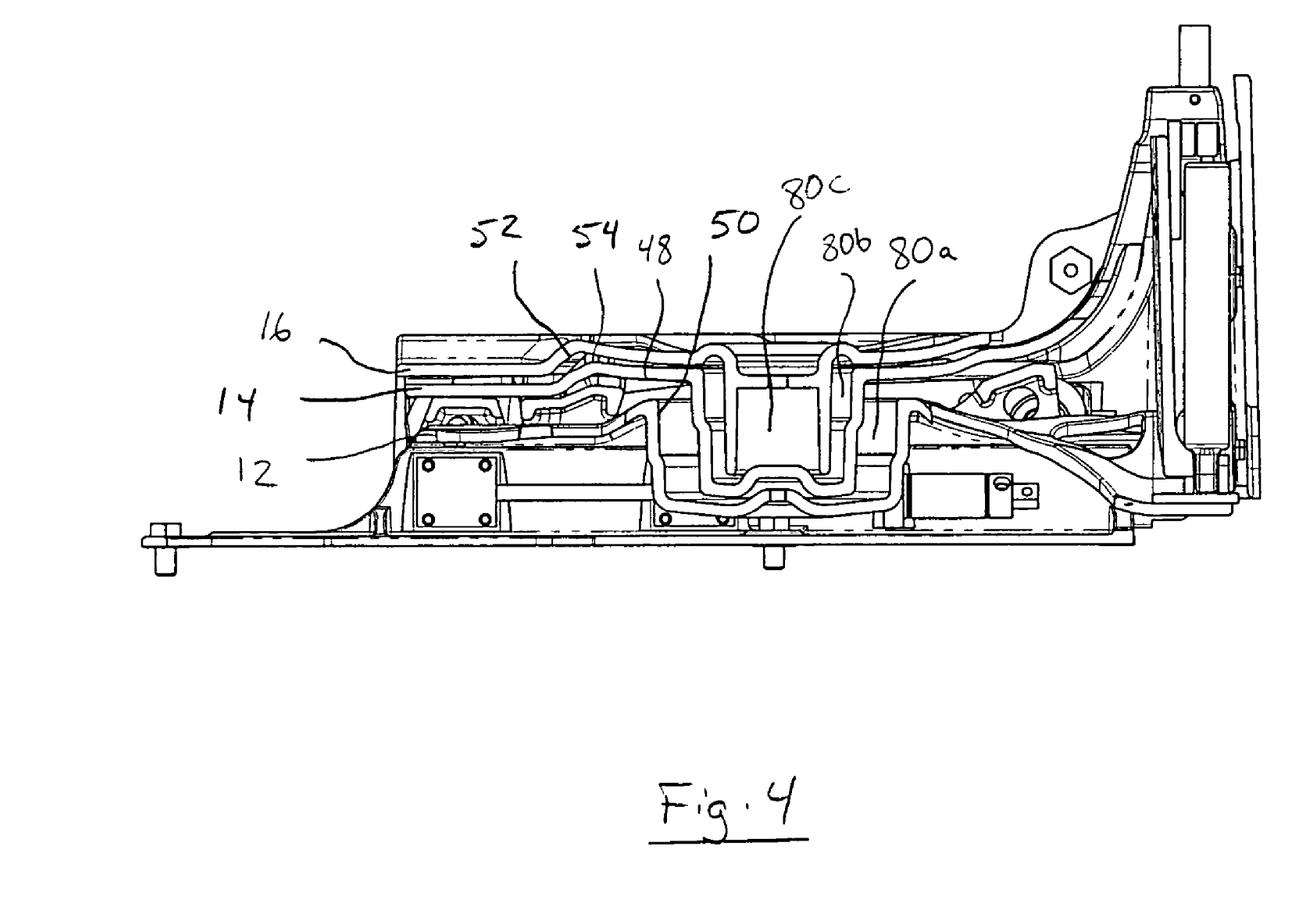
FIG. 4 is a cross-sectional view of the base shown in FIG. 1 to 3 with the seat in a minimum position, with the balloons removed to illustrate the space that is allocated to them.

Preferably, as shown in FIG. 4, the bottom surface 48 of the intermediate structure 14 is shaped to fit on the top surface 50 of the base structure 12, and a bottom surface 52 of the seat support structure 16 is shaped to fit on a top surface 54 of the intermediate structure 14.

Preferably, the seat support structure 16 is placed in a median position. The base 10 further comprises a levelling valve maintaining the seat support structure at the median position, within the range of motion of the suspension independently from the weight of the occupant, such that, when the seat support structure is at a seat support structure position lower than the median position, the levelling valve pressurizes the suspension balloon 34 with air from the pressurization means, and when the seat support structure is at a seat support structure position above the median position, the levelling valve depressurizes the suspension balloon 34 by letting the air escape to the atmosphere. The suspension therefore keeps always a same range of motion, as well as a stiffness and dampening effect independent from the height adjustment.

Preferably, the levelling valve is a rotative valve assembly that behaves such that, when the seat support structure 16 exceeds a certain height (which in turn displaces a lever of the valve beyond a certain upper limit angle), the suspension balloon 34 is depressurized, even for a short amount of time. Similarly, when the seat support structure 16 is below a certain height (which in turn displaces a lever of the valve under a certain lower limit angle), the suspension balloon 34 is pressurized, even for a short amount of time. Any oscillation of the seat support structure above and below the median position results in depressurization and pressurization of the suspension balloon 34 even under rapid oscillations to ensure maintenance of the seat support structure about the median position, independently of the weight being supported.

Preferably, the suspension damper 38 is an adjustable variable-damping-coefficient type damper.

Preferably, in accordance with a first preferred embodiment of the present invention, the base 10 further comprises an electrically controlled actuator linking the intermediate structure 14 to the seat support structure 16. The actuator comprises a controller, at least one detector on the seat, and a data transmission line between the detector and the controller for transmittal of information collected from the detector to the controller for the controller to generate actuator control commands.

Preferably, in accordance with another preferred embodiment of the present invention, the base 10 further comprises a variable damping system linking the intermediate structure 14 to the seat support structure 16. The variable damping system comprises a controller, at least one detector on the seat, and a data transmission line between the detector and the controller for transmittal of information collected from the detector to the controller for the controller to generate variable damping system control commands.

Preferably, in accordance with a first preferred embodiment of the present invention, the height-adjustment damper 40 has a damping coefficient sufficiently high to dynamically lock the intermediate structure 14 with respect to the base structure 12.

Preferably, in accordance with another preferred embodiment of the present invention, both the height-adjustment damper 40 and the suspension damper 30 have a damping coefficient such that the height-adjustment balloon 30, the height-adjustment damper 40, the suspension balloon 34 and the suspension damper 38 form a double serial suspension between the base structure 12 and the seat support structure 16.

Preferably, in accordance with a first preferred embodiment of the present invention, the base 10 further comprises a rigid locking system for releasably locking the intermediate structure 14 at a position with respect to the base structure 12, the locking system being actuated electrically.

Preferably, in accordance with another preferred embodiment of the present invention, the base 10 further comprises a rigid locking system for releasably locking the intermediate structure 14 at a position with respect to the base structure 12, the locking system being actuated mechanically.

In another preferred embodiment of the present invention, the base 10 comprises a suspension damper controller for controlling damping properties of the suspension damper 38.

Preferably, as shown in FIGS. 1 and 3, the suspension damper 38 and the height-adjustment damper 40 act vertically.

As mentioned above, a first part of the present base system is the height adjustment system of the seat, which integrates a balloon adjusted with a manual valve to obtain the desired height for the driver, and includes a locking system as well. This locking system can be rigid, and not allow any movement, or can be done through wet or dry friction.

A second part comprises a damped pneumatic passive suspension having a second balloon and a dampening mechanism which act always by suspending the seat support structure 16 in a defined vertical position with respect to the intermediate structure 14. The range of motion of the latter is consequently in linear relationship with the range of motion of the balloon or the suspension mechanism.

As shown in FIG. 5, the base structure 12 includes a front and back adjustment mechanism 44 for the seat. This movement is accomplished through sliding of two structures located at the bottom of the base of the seat through linear guides and work through ball bearings or slide rails. A locking mechanism is included with the block structures and the linear guide rails. Two linear guides 56 allow sliding of an upper structure 58 with respect to a lower structure 60 of the front-back adjustment mechanism 44. The locking mechanisms for the linear guides are located in blocks structures 18 and are actuated by pneumatic pistons 64 through rods 66.

The two balloons 30, 34 corresponding to the first and second sections of the base are each guided through an independent guiding system. In a preferred embodiment of the present invention, as shown in FIGS. 1 and 3, the guiding of the height adjustment is accomplished through a scissor mechanism 46 while the guiding of the suspension is done through a linear guide system, either with ball bearings or slide rails.

In a preferred embodiment of the present invention, a locking system put in parallel with the height adjustment balloon 30 could be a damper having a damping coefficient sufficiently high to dynamically lock the height adjustment balloon when it is submitted to vibration excitations, without however restricting the seat adjustment function of the balloon. In this embodiment, the locking is accomplished through wet friction.

Figure 6:
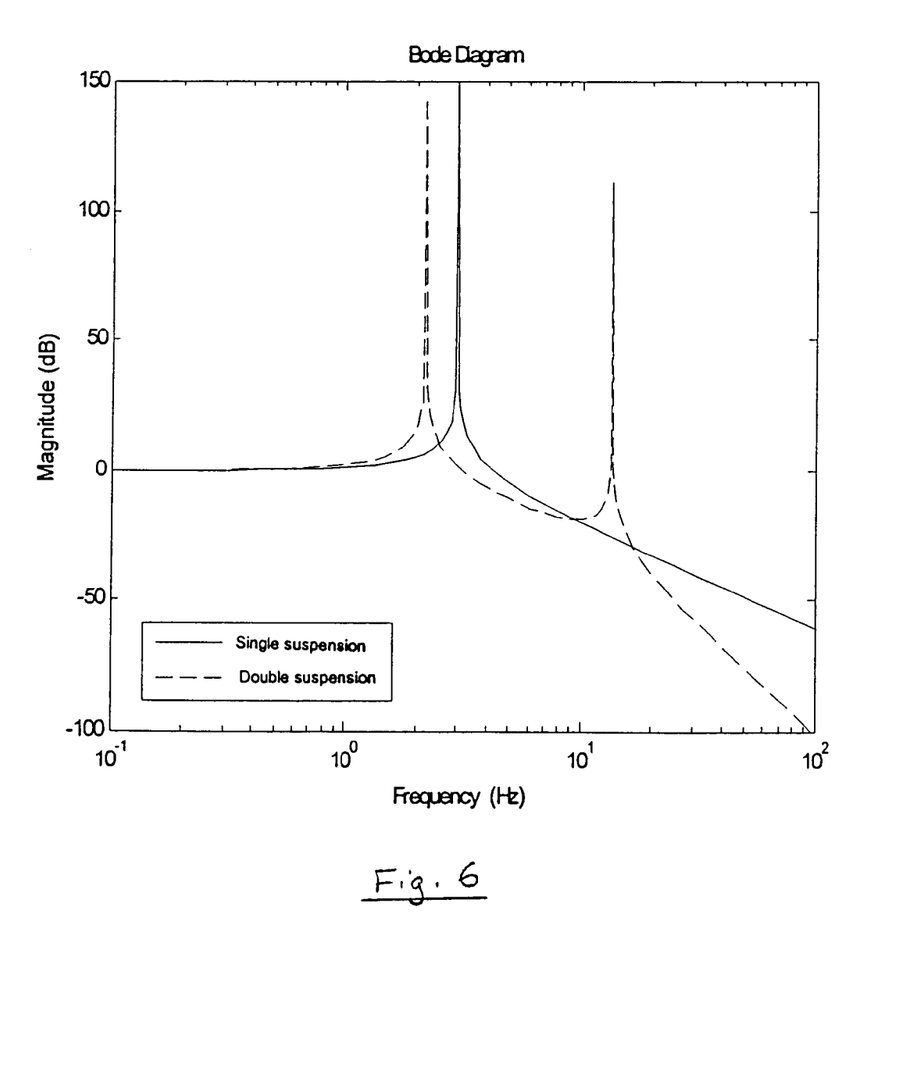
FIG. 6 is an analytic Bode Diagram of the transfer function for a single suspension (normal line) and of the same suspension in series with a second suspension (dotted line).

In another preferred embodiment of the present invention, it is possible to take advantage of the effect of the double serial suspension by using a lower damping coefficient damper for the first section of the base, which is the height adjustment part. The seat base then becomes a double serial suspension. A first advantage of such an embodiment is to decrease the natural frequency of the original single suspension. A second advantage is to have increase attenuation in the frequencies beyond the second natural frequency of the system associated with the first balloon. FIG. 6 shows the effect of the addition of a serial suspension to an existing simple single suspension.

Preferably, the base structure 12 is to be bolted to the floor of the vehicle. The base structure also supports the height adjustment balloon and that also allows front-back adjustment of the seat by sliding the seat with respect to the lower structure of the base structure 12. The intermediate structure 14 is at the same time an upper structure for the height adjustment balloon 30 and base structure for the suspension balloon 34. The seat support structure 16 is an upper structure on top of the suspension balloon 34 and on which are fixed on each side through pivot points 68 the back and bottom of the seat.

In a preferred embodiment of the present invention, the height adjustment damper 40, which serves as a locking system through wet friction, has a damping effect sufficiently high to dynamically lock the height adjustment balloon 30 when it is submitted to vibration excitations. The suspension balloon 34 is in parallel with a second damper, the suspension damper 38, which is ideally designed according to the weight of the seat occupant. The dampers and the balloons are positioned vertically in such a manner that the seat offers performances that are not affected by the height positioning of the seat.

In a preferred embodiment of the present invention, in order to ensure the possibility of offering the best damping performance irrespective of the weight of the occupant, the suspension damper 38 can be adjusted by the user through the use of a manual controller accessible to the driver.

In a preferred embodiment of the present invention, as shown on FIG. 3, the guiding system of the seat height adjustment part of the base is accomplished with a scissor mechanism 46. All movements related to the pivot points 70 as well as the linear guides 72 are accomplished through ball bearing mechanisms.

Preferably, as shown on FIG. 3, a suspension guiding system is placed in the back of the base of the seat through ball bearings with the help of linear guides 74. The linear guides link the intermediate structure 14 and the seat support structure 16 through two plates 76 on which are fixed the safety belt, which is not illustrated.

Preferably, as shown in FIGS. 2 and 4, the different structures of the base, including the base 12, intermediate 14 and seat support 16 structures mentioned hereinabove, fit one within the other through two socket and one cup structure 18, 22, 28 between which the balloons 30, 34 are inserted. When the height adjustment and the suspension are at a minimum position, the balloons, folded occupy the spaces 80a, 80b, 80c available between the socket and cup structures. As shown in FIG. 2, the height adjustment balloon 30 is telescopically positioned with respect to a support cylinder 42.

In accordance with a preferred embodiment of the present invention and during assembly of the invention, the balloons are independent from the base structures of the seat. In order to be unmolded, each of the balloons is made from two moulded rubber pieces and assembled together through vulcanization of a rubber seal. The first piece (34a for the suspension balloon and 30a for the height adjustment balloon) is made from fibrous rubber designed to resist to pressure and changes in shape due to the unravelling of the balloon. The second piece (34b for the suspension balloon and 30b for the height adjustment balloon) is made of non-fibrous rubber and is designed to make the balloon leak-proof. The cylindrical, socket and cup structures are the principal structures that play the role of support structures which hold the balloons in place.

Although the present invention has been explained hereinabove by way of a preferred embodiment thereof, it should be understood that the invention is not limited to this precise embodiment and that various changes and modifications may be effected therein without departing from the scope or spirit of the invention.

The invention claimed is:

1. A base for a seat comprising:
    a base structure comprising a first hollow upwardly open socket having a first socket inner surface;
    an intermediate structure comprising a second hollow upwardly open socket coaxially fitting within the first socket and having a second socket inner surface and a second socket outer surface;
    a seat support structure on which a bottom of the seat is fixed, the seat support structure comprising a hollow downwardly open cup structure coaxially fitting within the second socket;
    a height adjustment balloon having height adjustment balloon sidewalls resting against the first socket inner surface and the second socket outer surface for telescopic displacement of the intermediate structure with respect to the base structure;
    a suspension balloon having suspension balloon sidewalls resting against the second socket inner surface and the cup structure for telescopic displacement of the cup structure with respect to the second socket; and pressurization means for pressurizing the height adjustment balloon and the suspension balloon, wherein the height adjustment balloon and the suspension balloon are selectively and independently pressurized to provide a resilient adjustment of a height of the seat between a lower position and an upper position.

2. A base for a seat according to claim 1, further comprising a suspension damper linking the intermediate structure to the seat support structure.

3. A base for a seat according to claim 2, wherein the suspension damper is an adjustable variable-damping-coefficient type damper.

4. A base for a seat according to claim 2, further comprising a suspension damper controller for controlling damping properties of the suspension damper.

5. A base for a seat according to claim 1, further comprising a height-adjustment damper linking the intermediate structure to the base structure.

6. A base for a seat according to claim 5, wherein the height-adjustment damper has a damping coefficient sufficiently high to dynamically lock the intermediate structure with respect to the base structure.

7. A base for a seat according to claim 1, further comprising a hollow rigid tube sized to fit coaxially with the first and second sockets, between the first socket inner surface and the second socket outer surface and folding the height adjustment balloon when the seat is in the lower position.

8. A base for a seat according to claim 1, further comprising a front-back adjustment mechanism fixed to the base structure allowing displacement of the base along a horizontal plane.

9. A base for a seat according to claim 1, wherein the suspension balloon and height adjustment balloon act vertically along an axis generally in alignment with a center of gravity of the seat with an occupant.

10. A base for a seat according to claim 1, wherein each of the suspension balloon and of the height adjustment balloon is made from a first moulded rubber piece and a second moulded rubber piece that are assembled together through vulcanization of a rubber seal.

11. A base for a seat according to claim 1, further comprising a scissor mechanism linking the base structure to the intermediate structure.

12. A base for a seat according to claim 1, wherein a bottom surface of the intermediate structure is shaped to fit on a top surface of the base structure, and a bottom surface of the seat support structure is shaped to fit on a top surface of the intermediate structure.

13. A base for a seat according to claim 1, wherein the seat support structure is placed in a median position and the base further comprises a levelling valve maintaining the seat support structure at the median position, such that, when the seat support structure is at a seat support structure position lower than the median position, the levelling valve pressurizes the suspension balloon with air from the pressurization means, and when the seat support structure is at a seat support structure position above the median position, the levelling valve depressurizes the suspension balloon by letting the air escape to an atmosphere.

14. A base for a seat according to claim 13, wherein the levelling valve comprises a rotative valve assembly.

15. A base for a seat according to claim 1, further comprising:
   an electrically controlled actuator linking the intermediate structure to the seat support structure, the actuator comprising a controller;
   at least one detector on the seat; and
   a data transmission line between the at least one detector and the controller for transmittal of information collected from the detector to the controller for the controller to generate actuator control commands.

16. A base for a seat according to claim 1, further comprising:
   a variable damping system linking the intermediate structure to the seat support structure, the variable damping system comprising a controller;
   at least one detector on the seat; and
   a data transmission line between the at least one detector and the controller for transmittal of information collected from the detector to the controller for the controller to generate variable damping system control commands.

17. A base for a seat according to claim 1, further comprising a suspension damper linking the intermediate structure to the seat support structure and a height-adjustment damper linking the intermediate structure to the base structure, wherein the height-adjustment damper and the suspension damper have a damping coefficient such that the height-adjustment balloon, the height-adjustment damper, the suspension balloon and the suspension damper form a double serial suspension between the base structure and the seat support structure.

18. A base for a seat according to claim 1, wherein the base further comprises a rigid locking system for releasably locking the intermediate structure at a position with respect to the base structure, the locking system being actuated electrically.

19. A base for a seat according to claim 1, wherein the base further comprises a rigid locking system for releasably locking the intermediate structure at a position with respect to the base structure, the locking system being actuated mechanically.

20. A base for a seat according to claim 1, further comprising a suspension damper linking the intermediate structure to the seat support structure and a height-adjustment damper linking the intermediate structure to the base structure, wherein the suspension damper and the height-adjustment damper act vertically.

* * * * *